J. H. BAIR.
FLUID POWER TRANSMISSION APPARATUS.
APPLICATION FILED AUG. 17, 1917.
1,354,592.
Patented Oct. 5, 1920.
3 SHEETS—SHEET 1.
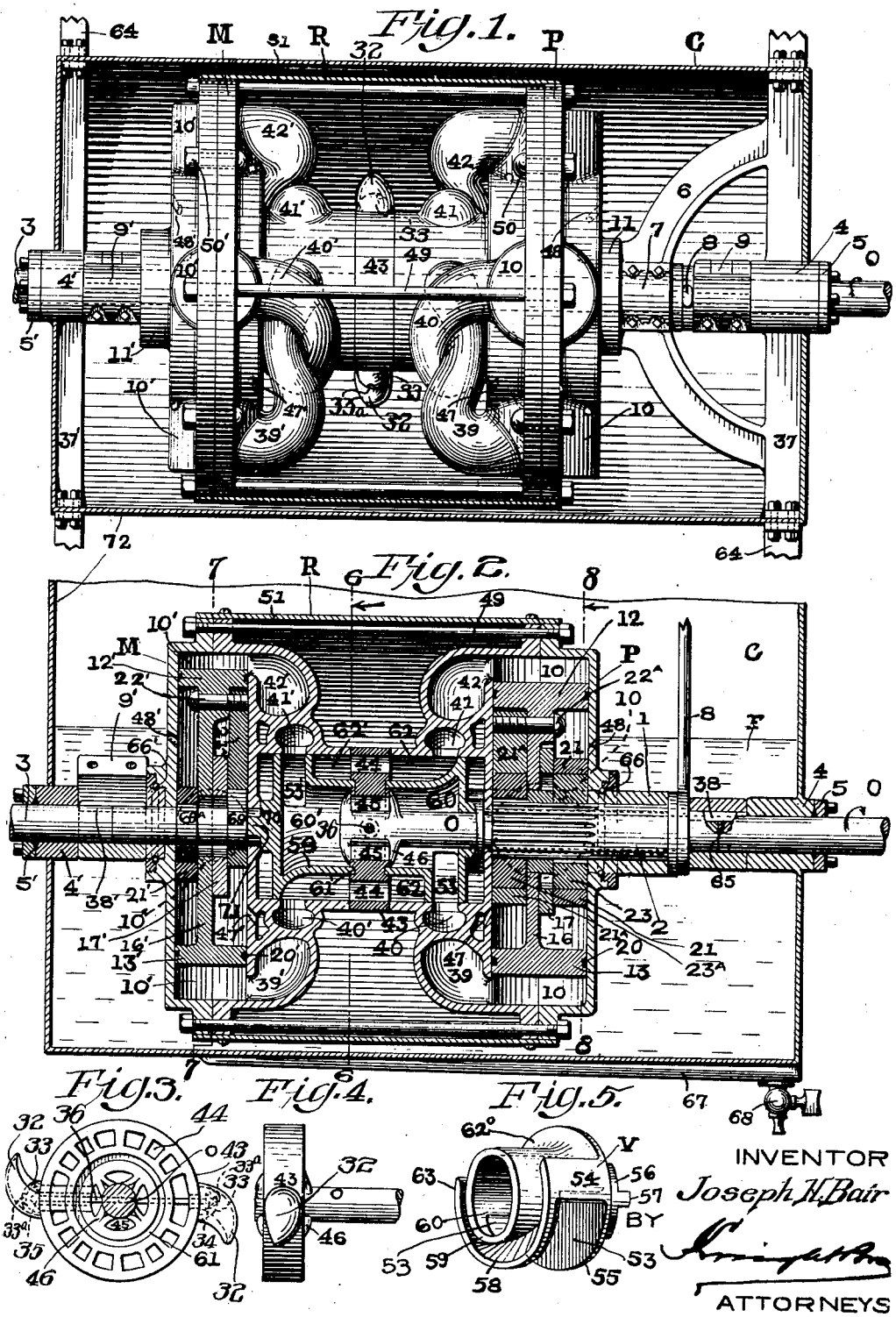

J. H. BAIR.
FLUID POWER TRANSMISSION APPARATUS.
APPLICATION FILED AUG. 17, 1917.
1,354,592.
Patented Oct. 5, 1920.
3 SHEETS—SHEET 2.
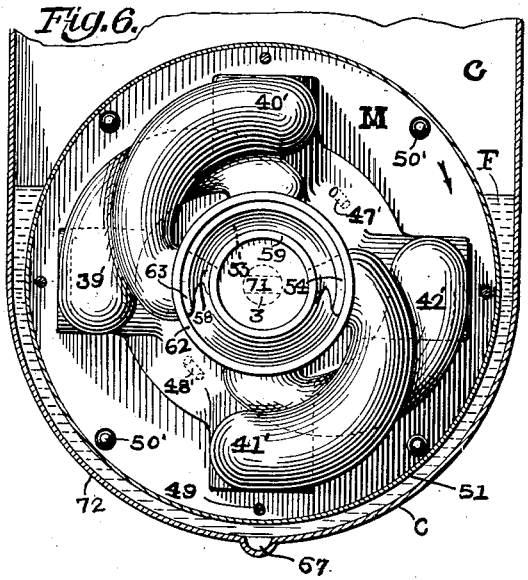
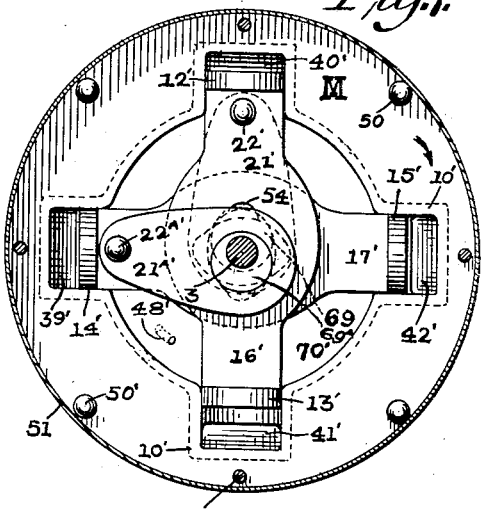
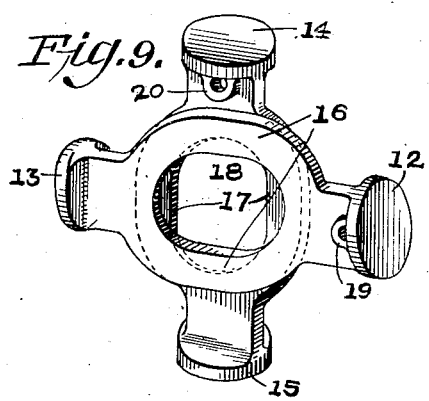
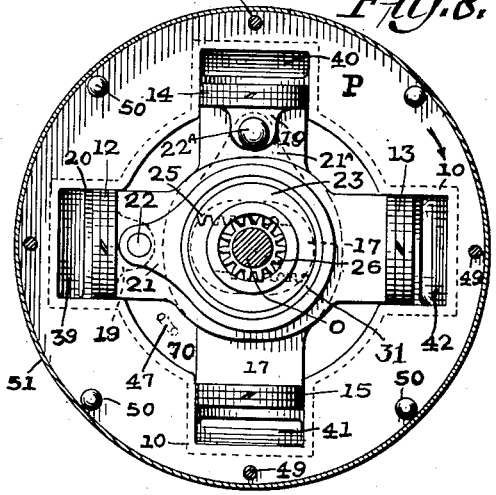
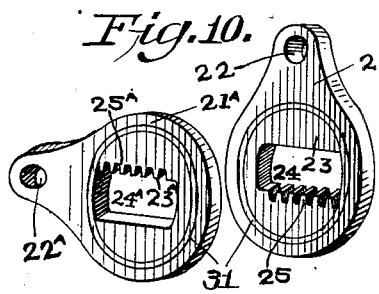
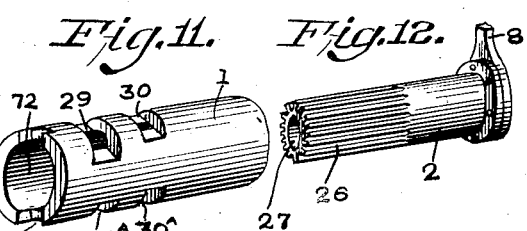
INVENTOR
Joseph H. Bair
BY
ATTORNEYS J. H. BAIR.
FLUID POWER TRANSMISSION APPARATUS.
APPLICATION FILED AUG. 17, 1917.
1,354,592.
Patented Oct. 5, 1920.
3 SHEETS—SHEET 3.
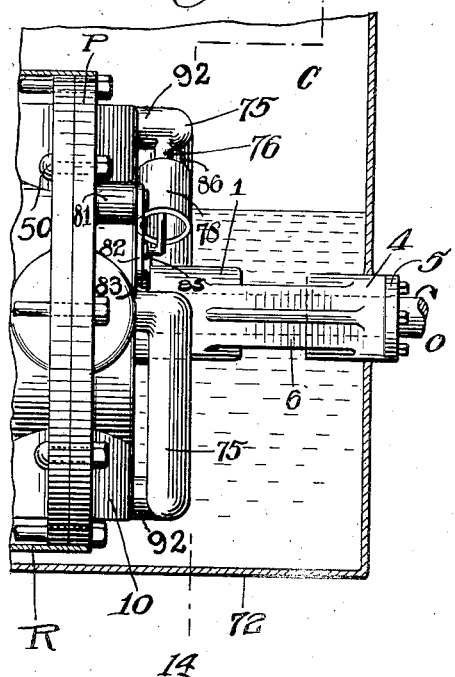
Fig. 13.
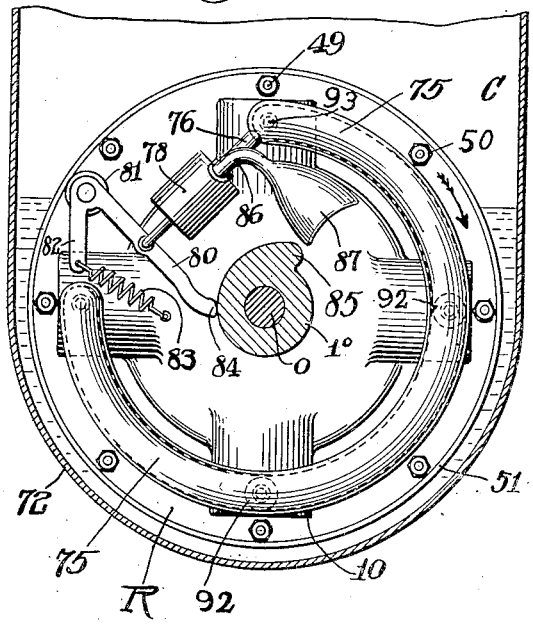
Fig. 14.
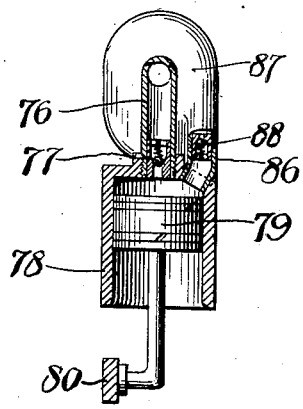
Fig. 15.
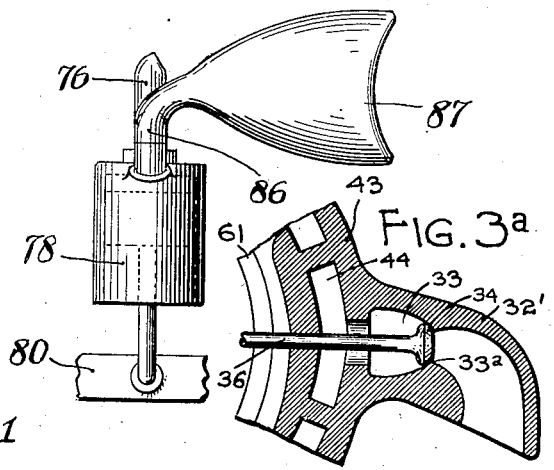
Fig. 16.
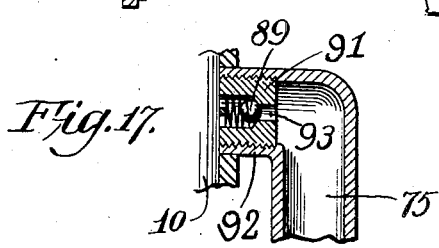
Fig. 17.
INVENTOR
Joseph H. Bair
BY
ATTORNEYS

UNITED STATES PATENT OFFICE.

JOSEPH H. BAIR, OF PHILADELPHIA, PENNSYLVANIA, ASSIGNOR OF EIGHTEEN-SIXTIETHS TO JAMES O. DAVID AND TEN-SIXTIETHS TO LEWIS H. TAYLOR, JR., BOTH OF PHILADELPHIA, PENNSYLVANIA, AND FIFTEEN-SIXTIETHS TO HERVEY S. KNIGHT, OF CHICAGO, ILLINOIS.

FLUID POWER-TRANSMISSION APPARATUS.

1,354,592.        Specification of Letters Patent.      Patented Oct. 5, 1920.

Application filed August 17, 1917. Serial No. 186,776.

*To all whom it may concern:*

Be it known that I, JOSEPH H. BAIR, a citizen of the United States, residing at Philadelphia, in the State of Pennsylvania, have invented certain new and useful Improvements in Fluid Power-Transmission Apparatus, of which the following is a specification.

This invention relates to an organization of mechanical elements for use in establishing a system of power transmission, embodying fluid as a transmitting medium; also to the construction of such mechanical elements *per se;* and particularly to a system, the elements of which are a pump adapted to be actuated from any suitable source of power, a fluid motor and pipes connecting the pump and the motor.

The primary object of the invention is to provide an organization of elements in such a system as above described, which will insure a higher degree of flexibility and a greater degree of efficiency in the transmission of power from a prime mover to a point of consumption than has heretofore been attainable with transmission systems of this type.

An object of the invention is to provide a transmission system which is particularly well suited for transmitting power from a prime mover to the traction wheels of a motor vehicle. The present invention employed in this capacity, takes the place of the clutch and transmission gears now in general use.

Another object of the invention is to provide a transmission system which will have a great leverage when the power-consuming end rotates at relatively slow speed, which will transmit power with substantially no loss when the power-consuming end rotates at equal speed, and which will reverse the direction of rotation of the consuming end, having at the same time a great leverage with relatively slow rotation or a speed equal to a prime mover, as the operator may desire.

Another object of the invention is to provide a transmission system in which by far the greater portion of the mass is adapted to revolve about a common center and hence operate also in the capacity of the ordinary fly wheel.

A further object of the invention is to provide a transmission system which is capable of driving a power consumer at any speed from a non-rotating position to a speed equivalent to that of the prime mover in either a forward or a reverse direction and also to assume a neutral position, and capable of being set at or intermediate of, any such positions by means of a single operating lever.

A still further object of the present invention is to provide means for keeping the system full of active oil during its operation whether in a neutral, a forward, or a reverse position.

For a more detail description of the present invention reference should now be had to the accompanying drawings in which—

Figure 1 illustrates in top plan view an embodiment of my improved transmission mechanism.

Fig. 2 is a vertical sectional view thereof.

Fig. 3 is a detail view, showing an end elevation of the power shaft, together with the transfer ports.

Fig. 3ª is a detail sectional view in larger scale of a portion of Fig. 3, showing one scoop and valve;

Fig. 4 is a detail view in elevation, similar to Fig. 3 but in quadrature thereto.

Fig. 5 is a detail perspective view of the timing valve used in both the pump and the motor.

Fig. 6 is a vertical section taken on the line 6—6 of Fig. 2.

Fig. 7 is a vertical section taken on the line 7—7 of Fig. 2.

Fig. 8 is a vertical section taken on the line 8—8 of Fig. 2.

Fig. 9 is a detail perspective view of the pump pistons showing their relation to each other when in position in the pump.

Fig. 10 is a detail perspective view of the shiftable eccentrics and straps of the pump shown in their relative angular positions.

Fig. 11 is a detail perspective view of the main pump shaft showing the cutouts for the eccentrics.

Fig. 12 is a detail perspective view of the pinion shaft for the shiftable eccentrics.

Fig. 13 is a fragmentary sectional view similar to Fig. 1 illustrating another form of the injector.

Fig. 14 is a vertical section taken on the line 14—14 of Fig. 13.

Fig. 15 is a detail sectional view of the injector pump.

Fig. 16 is a detail view in elevation of the injector pump, and

Fig. 17 is a detail sectional view of the valve positioned between the injector and the cylinder.

In general, the device comprises a driving shaft O upon which is secured the rotor R in a manner to be described later, the rotor consisting of two sets of chambers or cylinders, one of which sets will be hereinafter termed the driving chamber or pump P, and the other set will be termed the driven chamber or motor M. Positioned within the chambers or cylinders of the pump P are pistons having a variable stroke the amplitude of which is regulated by the lever 8 through the medium of the eccentrics 31. Positioned within the motor M is another set of pistons having a fixed stroke and also having connection with the power consuming shaft 3. The shaft O and the shaft 3 carry the valves. I prefer to make the pump pistons larger than the size of the motor pistons.

It is obvious that when the pistons of the pump P have a displacement equal to that of the motor M the fluid medium will flow through the system without transmitting any power whatsoever, but when the displacement in the pump P is altered either by increasing or by decreasing the displacement thereof, there will be a resultant movement of the pistons in the motor M, and a resulting movement of the motor shaft either in one or the other direction. It is also obvious that when the pistons of the pump are positioned in such a manner as to partake of no stroke whatsoever, the oil circulating system will be locked and the rotor R, with all the pistons locked against oscillation, will revolve as a single unit, transmitting the same rotation of power shaft O to the power consuming shaft 3.

In detail: O designates the engine or drive shaft entering the tank C through the bearing 4 on the frame 37 by means of which frame the tank and bearing are bolted to the chassis 64. The stuffing box 5 prevents gravity pressure leakage of oil F from the tank C. Integral with the frame 37 is a bracket 6 having a clamp 7 within which is clamped, by means of bolts, the stationary shaft 1. Oscillatorily mounted within the shaft 1 is the piston stroke adjusting shaft 2 provided with a pinion 26 which is adapted to mesh on opposite sides with the teeth 25—25$^a$ of the eccentrics 23—23$^a$ respectively. The eccentrics 23—23$^a$ have cutouts 24—24$^a$ which allow them to slide over the shaft 1 in the parallel grooves 30—30$^a$, 29—29$^a$. The grooves 30 and 29$^a$ are cut to a depth only of the hole 72 within which the pinion 26 fits. The opposed parallel grooves 30$^a$ and 29 are cut to the depth of the pinion teeth 26 on shaft 2. The width of the wall between the parallel slots in shaft 1 is equal to that of the cutouts 24—24$^a$ of the eccentrics 23—23$^a$ respectively, and the width of the grooves is equal to the thickness of the eccentrics so that they slide over the shaft in these slots in fitting relation. The distance between the slots 29 and 30 is equal to the thickness of the connecting webs 16 and 17 of the pistons 12—13 and 14—15 respectively. Encircling the eccentrics 23—23$^a$ are the straps 21—21$^a$ which are preferably of the same widths as the eccentrics. The straps 21—21$^a$ are connected to their respective pistons 12 and 14 by means of bearing pins 22—22$^a$ working in the piston bearings 19—20. The piston webs 16 and 17 are placed side by side and have clearance holes 18 for shaft 1 to pass through. The pistons 12—13, 14—15 are positioned in the cylinders 10, within which they are adapted to reciprocate and maintain a fluid-tight fit by means of the piston rings 20. The width of the confining chamber 70 in the cylindrical form of the pump P is the width occupied by the eccentrics and the straps positioned thereon. Communicating from without and positioned within the walls of the chamber 70 are the axially inclined holes 47 on one side of the chamber and 48 on the other, these holes serve to scoop the oil from the tank C into the chamber 70 when the device is in rotation. It is obvious that by this construction the shiftable eccentrics and their co-acting parts will at all times be bathed in oil. On the motor end of the device the motor M has a similar confining chamber 70′ in which the fixed eccentrics work. The holes 47′ and 48′ are positioned in a manner similar to holes 47 and 48 and serve the same purpose.

Drive shaft O passes into the tank C through its bearing 4 and is united to its continuance by a removable clip 9 pressing a key 38 into the slot 65 which is in line with a similar slot in shaft. The power shaft O terminates at its inner end in a perforated flange 43 by means of which it is rigidly clamped between and to the pump and motor members of the rotor by bolts 49, whereby rotation of the prime mover may be imparted to the rotor through shaft O. The pump P has a bearing 66 on the stationary shaft 1 and motor M has the bearing 66′ which may be an antifriction bearing if so desired and as herein illustrated.

Positioned within the cylinders 10' of the motor M are the pistons 12'—13', 14'—15' connected by the webs 16'—17' respectively. Pivoted to the webs at 22' and 22ª are the links 21' and 21ª which encircle the eccentrics 69 and 69ª on the shaft 3.

The motor parts are designated by the same characters as companion parts of the pump but distinguished by the prime mark. Extending from the head of each cylinder 10 of the pump and cylinder 10' of the motor are crossed pipes 39—40, 41—42 which communicate with valve chambers 62—62'.

The peripheral wall of valve chamber 62 into which the pipes from the pump cylinder heads enter, is divided into eight equal divisions around its circumference, four of which divisions are openings from the pipes and four of which are solid. The valve V (Figs. 2 and 5) which is located in chamber 62 and around which this chamber revolves has timing ports on the circular face which register with the openings 40 and 41 provided in the chamber. As is shown in more detail in Fig. 5, these timing ports 62° and 53 respectively, are diametrically opposed and occupy each three-eighths of the valve's circumference, leaving one-eighth solid wall 54 on each side between the ports. The rim 63 which is undercut at 58, but has a gently curved wall to separate port 53 from port 62°, extends five-eighths around the circumference and forms a tight fit against the valve chamber wall. Rim 63, together with the oppositely located peripheral closure area 54 by which the rim 63 is connected to the end flange 55, which together with the annular wall 59 forms a wall system by which ports 53 and 62° are separated. The flanged end 43 of drive shaft O has a series of axially extending ports 44 and besides is provided with a circular outer groove 61. This flange is also provided with axially extending ports 45 located inside of the circular groove 61. The annular wall 59 of the valve V extends actually beyond the sector rim 63, so that it may extend into groove 61 which forms a bearing support for the valve when in position.

Flange 43 is provided on its opposite face with a similar annular groove 61' by which is formed in a like manner a bearing for the respective extending annular end of valve V', disposed in reversed position relatively to valve V, and which is located in valve chamber 62'. Port 53 of valve V consequently connects with port 53' of the counter-valve V' by means of the intra-annular ports 60 and 60', communicating by means of inner openings provided in flange 43, while port 62° of valve V continued by the undercut passage 58, communicates with the counter port in valve V' and by means of the extra-annular openings 44 of flange 43. The valve V has at its closed end 55 a bearing stud 56 provided with a lug 57 by which it is locked to stationary shaft 1 by means of a slot 28, provided on the shaft end (see Figs. 5 and 11). Valve V' which is similarly constructed, has on its bearing end a lug 77' in mesh with slot 71 provided on the shaft 3 by means of which this valve is locked to shaft 3, so that it will rotate with the latter. From this construction, it is obvious that these valves will in all positions of rotation of the rotor and the motor, be maintained in correctly timed relation with the pistons with which they co-act.

In the motor M, at a moment during revolution, when the piston is out (and its companion or opposed piston is in), the valve V is in such a position that its closure members 54 cover the ports of the crossed pipes of two opposed cylinders. In this same position, the openings 53 and 62° are in direct communication with the crossed pipes leading to the other pair of opposed cylinders, one cylinder of the latter pair delivering its power stroke. Immediately upon movement of the piston in its power stroke, the dead center of the pair first mentioned is overcome and at the same time by the rotation of the rotor around the valve 60, the ports of the latter come into relative position to the pump ports, so that one of the pistons of the pair first mentioned immediately starts to expel oil and its companion to draw oil in. In this phase of the cycle there will be two cylinders (one of each pair) receiving oil and two cylinders expelling oil at the same moment, because all ports of the cylinder casing are opened at that time. Hence it is obvious that by this construction the power of transmission will be uniform and a "hang" upon dead center will be impossible.

The shaft 3 passes out of the tank C through the bearing 4' carried by the frame 37' which, like frame 37, is secured to the chassis 64. The bearing 4' is provided with a stuffing box 5' for preventing leakage of oil due to gravity pressure.

While this construction involves a closed system for the circulation of oil, there will be some leakage, and in order to overcome this difficulty and to maintain the system at all times filled with active oil, I provide the injector 32 which will be hereinafter more specifically described. Oil will leak out of the system, due to the great pressure of the oil therein, much easier than oil will seep into the system due to atmospheric pressure and in time the system would contain insufficient active oil to properly operate. To counteract this the injector 32 is provided which is positioned upon the disk 43 carried by the driving shaft O. The disk 43 is provided with an outer series of ports or passages 44 and an inner series of passages 45 for communication with the passages 62—62' and 60—60' of the valves, respectively, as described before. Communicating with the passages 45 is a conduit which terminates in the scoop 32 on the outside of the flange 43. Diametrically opposite the scoop 32 which communicates with the innermost passages 45 is an additional scoop 32' which communicates with an outer series of passages 44. The scoops 32—32' are provided each with a valve chamber 33 having an opening 33ª. Positioned within the valve chamber 33 are the valves 34 and 35 which are rigidly connected together by diametrically positioned rod 36 which is mounted for sliding movement axially in either direction, to close either port 34 or 35. By this construction it is obvious that only one of the valve ports 33ª will be opened at a time depending upon the direction of rotation of the shaft 3, controlling the pressure in the passages 44 and 45. In other words when the passages 44 are subjected to pressure, the valve 34 will be caused to be seated and prevent an escape of oil, whereas on the other end of the rod 36, valve 35 will be maintained opened and the scoop 32 will cause oil to be forced in through the opening 33ª around the valve seat 35 and into the passages 45, thus maintaining a system full of active oil at all times. When the direction of rotation of the shaft 3 is changed and the inner passages 45 are holding the pressure, the valve rod shifts into its other position and allows oil to enter the passages 44. It is desirable to slightly stagger the scoops 32 as shown in Fig. 4 in order that they will not "track" through the oil and follow in each other's wake.

Figs. 13 and 17 inclusive illustrate a modified form of injector for keeping the system filled with active oil. Communicating with each of the cylinders 10 of the pump P is a conduit 75. The conduit 75 at each cylinder is provided with an offset 92 within which is positioned the plug 91 having a passage 93 under the control of the ball check valve 89 which permits the flow of oil in the direction of the cylinder only. The conduit 75 is provided with a pipe 76 which connects the same with a single acting pump 78 having a piston 79 connected to a bell crank 80 pivoted at 81 to the frame of the pump P. The other end 82 of the bell crank 80 is provided with a contractile spring 83 by means of which the piston of the pump is caused to force oil through a pipe 76 into the conduit 75 and hence into the cylinders 10. The bell crank 80 is extended as at 84 in a manner to engage with the cam 85 upon the stationary shaft 1. By this construction it is obvious that the piston 79 will be forced to its maximum outward movement at every rotation of the pump P. The pump cylinder 78 is provided with an intake 86 and the in-flowing check valve 88. The end of the intake pipe 86 is provided with a scoop 87 for keeping the intake pipe filled with oil at all times. The pipe 76 leading to the conduit 75 is provided with a check valve 77 whereby backward flow of the oil is prevented. By this construction it is obvious that the stroke of the pump for each revolution will depend upon the quantity of oil needed to maintain a filled system. It can also be seen that by this construction oil is supplied to the head of the pump cylinder wherein upon the suction stroke of the piston, oil will be drawn in, provided there is an insufficiency of the same in the system, and, upon their compression stroke the valves 89 will close and prevent the escape thereof.

It will be seen from the drawings it is of obvious advantage to construct the cylinders of the pump and the motor, as shown in the drawings, in half sections and clamp the same together by means of the bolts 50—50'. The pump and motor are maintained in rigid relation by means of the tie rods 49. By this construction it is possible to greatly simplify the parts and at the same time render the device easily accessible for inspection or repairs. One of the half sections of both the motor and the pump is provided with an integral valve chamber and cross pipes. This design makes an extremely simple and highly efficient construction since the machining necessary to finish the article is reduced to a minimum and the chance of leakage and non-accuracy in the similar parts thus associated is greatly lessened.

As can be seen from the drawing, a fluid device has been produced having valves which are of relatively small size and immediately adjacent the turning center of the device. This is of great importance since it makes possible a slow velocity of contacting surfaces which means a relatively low co-efficient of friction.

In the preferred embodiment of the invention, the parts are positioned within a tank C filled with oil F. The bottom of the tank C is provided with a drain 67 under the control of the stop-cock 68. The rotor R is provided with a cylindrical drum 51 in order to prevent undue splashing and turbulent currents in the oil F due to the rotation of the rotor.

As shown in Fig. 2 of the drawings, the driving shaft O and the driven shaft 3 comprise two sections which are secured together by the clamping collars 9 and 9' respectively. By this construction it is only necessary to remove the clamping collars 9 and 9' and the bearing section 7 of the bracket 6 in order to remove the rotor from the tank C for purposes of inspection, adjustment or the like.

From the foregoing description it is obvious that the fluid power-transmission apparatus constructed in accordance with the present invention will be of an extremely s..ple and comparatively inexpensive nature, and adapted for easy and convenient assembly.

It will be obvious that the invention is susceptible of change and modification without material departure from the operative principles and spirit thereof, and for this reason the invention is to be understood as being not limited to the precise arrangement and formation of the several parts selected for illustration, but extending in scope to the definitions found in the appended claims.

What I claim is:

1. In a device of the class described, a driving element chamber, a driven element, a driven element chamber, the two chambers being connected, fluid impulse imparting means in the first chamber timing valves, axially in alinement with the driving and driven element, to direct fluid against the driven element in the second chamber and means for varying the displacement of the first chamber over that of the second chamber.

2. In a device of the class described, a driving element having a plurality of driving element chambers, a driven element having a plurality of driven element chambers, valves for the chambers axially in alinement with the driving and driven element for controlling the flow of a fluid therebetween, fluid impulse imparting means in the driving chambers to direct fluid against the driven elements, and means for increasing the displacement of the driving element chambers over that of the driven element chambers.

3. In a device of the class described, a driving element chamber, a driven element, a driven element chamber, the two chambers being connected, fluid impulse imparting means in the first chamber timing valves axially in alinement with the driving and driven element to direct fluid against the driven element, and means for increasing the displacement of the first chamber over that of the second chamber, said chambers comprising cylinders, said fluid imparting means and driven element comprising pistons.

4. In a device of the class described, a driving element chamber, a driven element chamber, a driven element, the two chambers being connected, fluid impulse imparting means in the first chamber timing valves axially in alinement with the driving and driven element to direct fluid against the driven element in the second chamber and means for increasing the displacement of the first chamber over that of the second chamber, said chambers comprising cylinders and, said fluid imparting means, and said driven element comprising pistons, said displacement increasing means comprising means for varying the stroke of the piston relative to its cylinder.

5. In a device of the class described, a driving element chamber, a driven element, a driven element chamber, connecting means for said chambers, fluid impulse imparting means in the first chamber to direct fluid against the driven element in the second chamber and means for increasing the displacement of the first chamber over that of the second chamber; said connecting means comprising conduits leading from the chamber heads to valve chambers within which valves are adapted to be mounted for controlling the flow of oil between the said chambers.

6. In a fluid power-transmission apparatus, a driving unit comprising pump and motor cylinders rigidly connected to each other, pistons in the pump and motor cylinders, a stationary shaft for controlling the position of the pistons in the pump, a power-consuming shaft controlled by the pistons in the motor, conduits leading from the cylinder heads of both the pump and motor to valve chambers and valves in said valve chambers controlled by the stationary and power-consuming shafts.

7. In a fluid power-transmission apparatus, a driving unit comprising pump and motor cylinders rigidly connected to each other, pistons in the pump and motor cylinders, a hollow stationary shaft having means for controlling the position of the pistons in the pump, a power-consuming shaft controlled by the movement of the pistons in the motor, a driven shaft within said stationary shaft and means connecting said driven shaft and said driven unit; said cylinders being provided with conduits which terminate in valve chambers, said means connecting the driven shaft and the driven unit being also adapted to connect said valve chambers.

8. In a fluid power-transmission apparatus, a driving unit, comprising pump and motor cylinders, pistons in said cylinders, a hollow stationary shaft having means for controlling the position of the pistons in the pump cylinders and a power-consuming shaft controlled by the movement of the pistons in the motor, each of said cylinders of the pump having a conduit leading to a common valve chamber, each of the cylinders of the motor being provided with a conduit leading to a second common valve chamber, valves in said chambers for controlling the fluid movement between the pump and the motor, a driving shaft positioned within said stationary shaft and driving means upon the inner end of said driving shaft extending into the plane of the valve chamber and clamping means for maintaining said pump cylinders, motor cylinders and driving means in rigid relation.

9. In a device of the class described, a driving element chamber, a driven element, a driven element chamber, connecting means for said chambers, fluid impulse imparting means in the first chamber to direct fluid against the driven element and means for replenishing the supply of fluid in the device, said fluid replenishing means comprising a scoop adapted to rotate in a surplus of oil and force the same into the system.

10. In a device of the class described, a driving element chamber, a driven element, a driven element chamber, connecting means for said chambers, fluid impulse imparting means in the first chamber to direct fluid against the driven element of the second chamber and means for replenishing the supply of fluid in the device, said fluid replenishing means comprising a scoop adapted to rotate in a surplus of oil and force the same into the system and valves adapted to control the flow of oil through said scoop.

11. In a fluid power-transmission apparatus, a driven unit, comprising a plurality of pump and motor cylinders, pistons in said pump and motor cylinders, a stationary shaft for controlling the position of the pistons in the pump and a power-consuming shaft controlled by the movement of the pistons in the motor and means for replenishing the supply of fluid in the system comprising a conduit common to the pump cylinder, means for maintaining a supply of oil in the conduit, and check valves positioned between the conduit and the pump cylinders whereby fluid is permitted to flow in the direction of the cylinders only.

12. In a fluid power-transmission apparatus, a driven unit, comprising a plurality of pump and motor cylinders, pistons in said pump and motor cylinders, a stationary shaft for controlling the position of the pistons in the pump and a power-consuming shaft controlled by the movement of the pistons in the motor and means for replenishing the supply of fluid in the system comprising a conduit common to the pump cylinders, and a pump for maintaining a supply of fluid in the conduit.

13. In a fluid power-transmission apparatus, a driving unit, comprising a plurality of pump and motor cylinders, pistons in said pump and motor cylinders, a stationary shaft having means for controlling the position of the pistons in the pump and a power-consuming shaft controlled by the movement of the pistons in the motor and means for replenishing the supply of fluid in the system comprising a conduit common to the pump cylinders, a pump for maintaining a supply of fluid in the conduit, said pump comprising a cylinder and piston, a lever for operating said piston, a spring for retracting said piston and lever, and a cam upon the aforementioned stationary shaft for extending said piston and lever.

14. In a fluid power-transmission apparatus, a driving unit, comprising a plurality of pump and motor cylinders, pistons in said pump and motor cylinders, a stationary shaft having means for controlling the position of the pistons in the pump and a power-consuming shaft controlled by the movement of the pistons in the motor and means for replenishing the supply of fluid in the system comprising a conduit common to the pump cylinders, a pump for maintaining a supply of fluid in the conduit, said pump comprising a cylinder and piston having means for automatically imparting its driving stroke and means on said stationary shaft for imparting the return stroke thereof.

15. In an article of the class described, a driving shaft, a driven shaft, a rotor adapted to be positioned between said shafts and removable securing means for securing the rotor to the shafts, whereby the rotor may be bodily removed from the driving and driven shafts.

16. In a fluid power-transmission apparatus, a driving unit comprising pump and motor cylinders rigidly connected to each other, pistons in the pump and motor cylinders, a stationary shaft for controlling the position of the pistons in the pump and a power-consuming shaft controlled by the movement of the pistons in the motor and means for increasing the displacement of the pump pistons over that of the motor pistons, said displacement increasing means comprising shiftable eccentrics mounted upon said stationary shaft and having a common means for varying their eccentricity.

17. In a fluid power-transmission apparatus, a driving unit comprising pump and motor cylinders rigidly connected to each other, pistons in the pump and motor cylinders, a stationary shaft for controlling the position of the pistons in the pump and a power-consuming shaft controlled by the movement of the pistons in the motor and means for increasing the displacement of the pump pistons over that of the motor pistons, said displacement increasing means comprising eccentrics mounted upon the said stationary shaft and having connection with the said pump pistons, said eccentrics having a common means for varying their eccentricity.

18. In a fluid power-transmission apparatus the driving unit comprising pump and motor cylinders rigidly connected to each other, pistons in the pump and motor cylinders, a stationary shaft for controlling the position of the pistons in the pump and a power-consuming shaft controlled by the movement of the pistons in the motor and means for increasing the displacement of the pump pistons over that of the motor pistons, said displacement increasing means comprising eccentrics mounted upon the said stationary shaft and having connection with the said pump pistons, said eccentrics being slidably mounted upon the said stationary shaft and having one of their engaging faces provided with a rack, and a pinion common to the racks of the eccentrics for varying their eccentricity.

19. In a fluid power-transmission apparatus, a driving unit comprising pump and motor cylinders rigidly connected to each other, pistons in the pump and motor cylinders, a stationary shaft for controlling the position of the pistons in the pump and a power-consuming shaft controlled by the movement of the pistons in the motor and means for increasing the displacement of the pump pistons over that of the motor pistons, said displacement increasing means comprising eccentrics mounted upon the said stationary shaft and having connection with the said pump pistons, said eccentrics being slidably mounted upon the said stationary shaft and having one of their engaging faces provided with a rack, and a pinion common to the racks of the eccentrics for varying their eccentricity, said pinion being hollow and having a shaft positioned therein for driving the driven unit.

20. In a fluid power-transmission apparatus, a driving unit comprising pump and motor cylinders rigidly connected to each other, pistons in the pump and motor cylinders, a stationary shaft for controlling the position of the pistons in the pump and a power-consuming shaft controlled by the movement of the pistons in the motor and means for increasing the displacement of the pump pistons over that of the motor pistons, said displacement increasing means comprising eccentrics mounted upon the said stationary shaft and having connection with the said pump pistons, said eccentrics being slidably mounted upon the stationary shaft and having one of their engaging faces provided with a rack, and a pinion common to the racks of the eccentrics for varying their eccentricity, said pinion being hollow and having a shaft positioned therein for driving the driven unit, the other end of said pinion being provided with a control lever.

21. In a fluid power-transmission apparatus, a driving unit comprising pump and motor cylinders rigidly connected to each other, pistons in the pump and motor cylinders, a hollow stationary shaft having eccentrics shiftably positioned thereon for controlling the position of the pistons in the pump, a power-consuming shaft controlled by the movement of the pistons in the motor, a driven shaft within said stationary shaft and means connecting said driven shaft and said driven unit.

22. In a fluid power-transmission apparatus, a driving unit comprising pump and motor cylinders rigidly connected to each other, pistons in the pump and motor cylinders, a hollow stationary shaft having eccentrics shiftably positioned thereon for controlling the position of the pistons in the pump, a power-consuming shaft controlled by the movement of the pistons in the motor, a driven shaft within said stationary shaft, means connecting said driven shaft and said driven unit and means within said stationary shaft and surrounding said driven shaft for controlling the position of said eccentrics.

23. In a fluid power-transmission apparatus, a driving unit comprising pump and motor cylinders rigidly connected to each other, pistons in the pump and motor cylinders, a hollow stationary shaft having eccentrics shiftably positioned thereon for controlling the position of the pistons in the pump, a power-consuming shaft controlled by the movement of the pistons in the motor, a driven shaft within said stationary shaft, means connecting said driven shaft and said driven unit and means within said stationary shaft and surrounding said driven shaft for controlling the position of said eccentrics, said stationary shaft being provided with cut-outs through which are adapted to be extended portions of the eccentrics for engagement with said eccentricity controlling means.

24. In a fluid power-transmission apparatus, a driving unit, comprising a plurality of pump and motor cylinders, pistons in said pump and motor cylinders, a stationary shaft having means for controlling the position of the pistons in the pump and a power-consuming shaft controlled by the movement of the pistons in the motor and means for replenishing the supply of fluid in the system comprising a conduit common to the pump cylinders, a pump for maintaining a supply of fluid in the conduit, said pump comprising a cylinder and piston, a lever for operating said piston, a spring for retracting said piston and lever, and a cam upon the aforementioned stationary shaft for extending said piston and lever and means for adjusting the pressure of the driving stroke of said pump.

The foregoing specification signed at Philadelphia, Pennsylvania, this 2d day of April, 1917.

JOSEPH H. BAIR.